US012506687B2

(12) United States Patent
Bhatia et al.

(10) Patent No.: US 12,506,687 B2
(45) Date of Patent: Dec. 23, 2025

(54) IN-NETWORK SOLUTION FOR LOW-LATENCY COMMUNICATIONS USING SEGMENT ROUTING

(71) Applicant: Nokia Solutions and Networks Oy, Espoo (FI)

(72) Inventors: Randeep Bhatia, Green Brook, NJ (US); Steven Benno, Towaco, NJ (US); Fang Hao, Morganville, NJ (US); TV Lakshman, Morganville, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 379 days.

(21) Appl. No.: 18/063,302

(22) Filed: Dec. 8, 2022

(65) Prior Publication Data

US 2024/0195738 A1 Jun. 13, 2024

(51) Int. Cl.
*H04L 45/74* (2022.01)
*H04L 45/58* (2022.01)

(52) U.S. Cl.
CPC .............. *H04L 45/74* (2013.01); *H04L 45/58* (2013.01)

(58) Field of Classification Search
None
See application file for complete search history.

(56) References Cited

U.S. PATENT DOCUMENTS

| 7,478,109 | B1 | 1/2009 | Panigrahy et al. |
| 9,979,595 | B2 | 5/2018 | Choudhury et al. |
| 11,356,501 | B1 | 6/2022 | Hashisho et al. |
| 2005/0163122 | A1 | 7/2005 | Sahni et al. |
| 2009/0147789 | A1* | 6/2009 | Ng ...................... H04L 61/5007 370/392 |
| 2010/0046399 | A1 | 2/2010 | Kakivaya et al. |
| 2011/0016223 | A1 | 1/2011 | Iannaccone et al. |
| 2013/0094404 | A1 | 4/2013 | Van Wyk et al. |
| 2019/0215267 | A1* | 7/2019 | Filsfils ..................... H04L 45/34 |
| 2022/0027208 | A1* | 1/2022 | Kong ...................... G06F 9/455 |

(Continued)

FOREIGN PATENT DOCUMENTS

WO 2021124575 A1 6/2021

OTHER PUBLICATIONS

Gundavelli, S., et al. "Proxy Mobile IPv6." RFC 5213, Internet Engineering Task Force (Aug. 2008): 1-92.

(Continued)

*Primary Examiner* — Xavier S Wong
(74) *Attorney, Agent, or Firm* — Mendelsohn Dunleavy, P.C.; Steve Mendelsohn

(57) ABSTRACT

A segment routing (SR) network has a plurality of interconnected SR gateways, where each of a plurality of local networks is connectable to an SR gateway at an edge router of the local network. An SR network control plane maintains a locator database that maps (i) a global IP (GIP) address for user equipment (UE) to (ii) an IP address of a downstream node associated with the UE along a path from the SR network to the UE. An SR gateway (i) receives a message for the UE and (ii) addresses the message to the IP address of the downstream node. The SR network control plane updates the locator database to map (i) the GIP address for the UE to (ii) a different IP address of a downstream node upon the SR network control plane determining that the association of the UE has changed to the different IP address.

20 Claims, 4 Drawing Sheets

(56) References Cited

U.S. PATENT DOCUMENTS

2022/0321468 A1* 10/2022 Mestery .............. H04L 45/566
2022/0377012 A1    11/2022 Doddapaneni et al.
2023/0066013 A1*  3/2023 Ball .................... G06F 21/606

OTHER PUBLICATIONS

Perkins, C., et al. "Mobility Support in IPv6." RFC 6275, Internet Engineering Task Force (Jul. 2011): 1-189.

Liebsch, M., et al. "Proxy Mobile IPv6 (PMIPv6) Localized Routing Problem Statement." RFC 6279, Internet Engineering Task Force (Jun. 2011): 1-14.

Farinacci, D., et al. "The Locator/ID Separation Protocol (LISP)." RFC 6830, Internet Engineering Task Force (Jan. 2013): 1-75.

Herbert, Tom. "Identifier-locator addressing for IPv6." Internet Draft, Internet Engineering Task Force. Version draft-herbert-nvo3-ila-03 (Oct. 2016): 1-44.

Tsubouchi, Koji, et al. "Anchorless Routing for URLLC Services in 5G Network." 2018 IEEE 88th Vehicular Technology Conference (VTC-Fall), Chicago, IL, USA. (2018): 1-5.

Fdio, "Vector Packet Processing." Repository, <URL: https://github.com/FDio/vpp> (2015): 4 pages.

Hochbaum, Dorit S., et al. "A Unified Approach to Approximation Algorithms for Bottleneck Problems." Journal of the Association of Computer Machinery 33.3 (1986): 533-550.

Fakcharoenphol, Jittat, et al. "A Tight Bound on Approximating Arbitrary Metrics by Tree Metrics." Proceedings of the 35th Annual ACM Symposium on Theory of Computing. San Diego, CA, USA (Jun. 2003): 1-8.

Bhatia, Randeep, et al., "Locator Lookup-Based, Low-Latency, Multi-Access IP Mobility", U.S. Appl. No. 18/063,314, filed Dec. 8, 2022 (46 pages).

Notice of Allowance for U.S. Appl. No. 18/063,314; dated Oct. 17, 2023 (11 pages).

Extended European Search Report for corresponding European application No. 23213065.8; dated Apr. 22, 2024 (12 pages).

* cited by examiner

400

IN-NETWORK SOLUTION FOR LOW-LATENCY COMMUNICATIONS USING SEGMENT ROUTING

BACKGROUND

Field of the Disclosure

The present disclosure relates to wireless communication systems.

Description of the Related Art

This section introduces aspects that may help facilitate a better understanding of the disclosure. Accordingly, the statements of this section are to be read in this light and are not to be understood as admissions about what is prior art or what is not prior art.

The speed improvement of mobile access networks is enabling delay-sensitive applications such as augmented reality, future of factory, and automated driving. However, one critical issue that remains to be addressed is how to ensure that the quality of service (QoS) of such apps is not affected by user equipment (UE) mobility. In current 4G/5G networks, when a UE moves across a wide area network, the packet delivery may incur either disruption due to the IP address change or higher delay due to triangular routing. In addition, although UEs may have access to multiple provider networks through one or multiple access technologies (4G/5G/WiFi, etc.), it remains a challenge to utilize such different network resources effectively. The newer mobile access technologies, such as 5G and 6G, tend to rely on smaller cell sizes and higher densities of base stations. This is likely to increase the demand for UEs to transit between anchor points (with significantly more dynamism in their IP addresses). Hence, there is a pressing need for a practical IP mobility solution to support the newly emerging delay-sensitive applications.

SUMMARY

This disclosure proposes a new approach to IP mobility that takes advantage of segment routing (SR) and software routers by (i) relying on an SR-enabled backbone network and BGP anycast to achieve anchorless IP mobility without requiring changes to UEs and (ii) using software routers to support fast routing-table update. With additional support from UE, the solution can also be extended to support seamless IP mobility across multiple access technologies by relying on IP protocols instead of cellular protocols.

In at least one embodiment of the present disclosure, a segment routing (SR) network is configured to be connected to a plurality of local networks, the SR network comprising a plurality of interconnected SR gateways, wherein each local network is connectable to an SR gateway at an edge router of the local network. An SR network control plane of the SR network is configured to maintain a locator database configured to map (i) a global IP (GIP) address for a user equipment (UE) to (ii) an IP address of a downstream node associated with the UE along a path from the SR network to the UE. An SR gateway is configured to (i) receive a message for the UE and (ii) address the message to the IP address of the downstream node. The SR network control plane is configured to update the locator database to map (i) the GIP address for the UE to (ii) a different IP address of a downstream node upon the SR network control plane determining that the association of the UE has changed to the different downstream node IP address.

In at least one other embodiment of the disclosure, user equipment (UE) comprises (i) a plurality of network interfaces corresponding to different types of local access networks and (ii) a virtual segment router (vSR) module connected to the plurality of network interfaces and configured to support segment routing via any of the different types of local access networks.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Basic Architecture

Figure 1:
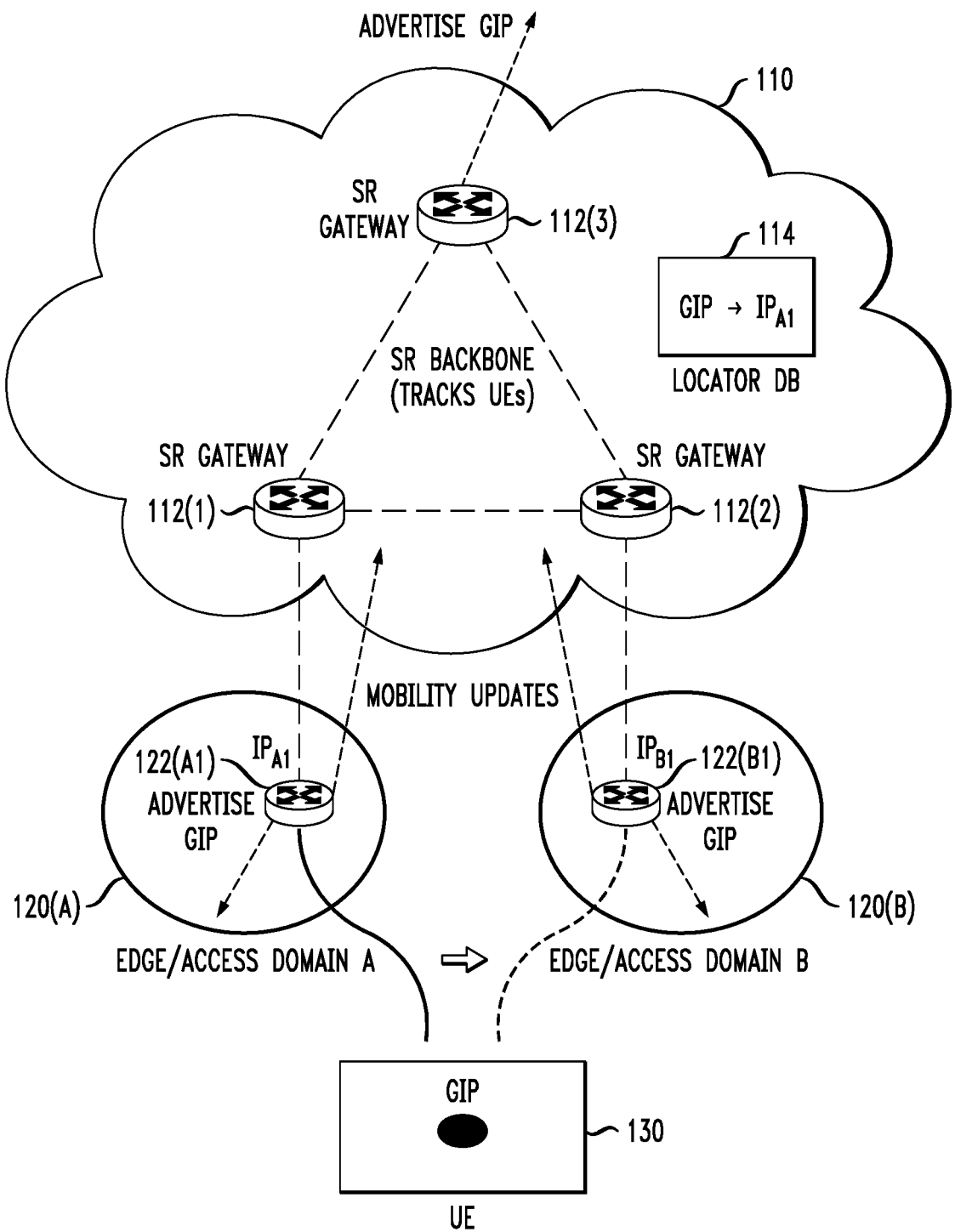
FIG. 1 is a simplified block diagram of a communication (comm) system according to an embodiment of the disclosure.

FIG. 1 is a simplified block diagram of a communication (comm) system 100 according to an embodiment of the disclosure. In particular, comm system 100 includes a segment routing (SR) network 110 having interconnected SR gateways 112(1)-112(3) and a locator database (DB) 114. SR network 110 enables low-latency IP mobility service across wide area networks. As understood by those skilled in the art, an SR gateway 112 is a node of SR network 110 that, in addition to being connected to one or more other nodes internal to SR network 110, may be directly connected to the edge router 122 of one or more local access networks 120

(aka local networks, edge networks, or access domains) that are external to SR network 110. For example, in FIG. 1, SR gateway 112(1) is connected to edge router 122(A1) of local network 120(A), and SR gateway 112(2) is connected to edge router 122(B1) of local network 120(B).

Although not explicitly shown in FIG. 1, SR network 110 may have one or more additional SR gateways 112 as well as one or more internal SR nodes that, together with SR gateways 112(1)-112(3), form a mesh network of interconnected nodes within SR network 110 that supports segment routing of packets through and within SR network 110. Similarly, although not explicitly shown in FIG. 1, each SR gateway 112 may be connected to an edge router 122 of one or more local networks 120, and each local network 120 may have one or more interconnected nodes in addition to its edge router 122.

SR network 110 can be provided by a single service provider or multiple service providers. SR network 110 can also be owned by webscalers such as Google Cloud or Microsoft Azure. In this case, the webscaler can use its own backbone transport network to (i) provide connectivity between different local domains of the different service providers, and (ii) keep track of the current UE locations.

In some implementations, SR network 110 is a Segment Routing IPv6 (SRv6) network. Other types of SR networks, such as Segment Routing-Multi-Protocol Label Switching (SR-MPLS) networks, are also possible. Note that some SRv6 implementations do not require all routers on the paths between SRv6 network routers to support segment routing as long as they support IPv6 forwarding. A block of IPv6 addresses (i.e., one or more mobile IPv6 prefixes) are allocated for the global IP mobility service. Each UE that subscribes to the mobility service is assigned a unique GIP address from this block. The service provider has one or more local networks from which a subscribing UE can obtain wireless service. SR network 110 is used to provide connectivity across different local networks. Each UE is always identified by its GIP, regardless of its location/association.

A device (e.g., UE 130) is assigned a unique, permanent global IP (GIP) address that allows corresponding nodes to make connections. This GIP address is advertised by all SR network routers, so that any corresponding node in the wide area network can access this GIP through its closest SR network router (i.e., an SR gateway 112 in SR network 110). Within each local network 120, an edge router 122 serves as the anchor to forward packets for the UEs in this domain. When a UE moves across domains, the corresponding edge router 122 reports the UE location to SR network 110, so that the SR network can keep track of the current domain-level location of each UE.

An edge router provides mobility support within its local network, similar to a conventional mobile IP solution. However, unlike the conventional solution, here each edge router advertises the entire GIP prefix, regardless of which local network each UE is currently in. In addition, all SR network routers also advertise the GIP prefix. This results in an anycast-like service, where all corresponding nodes connect to the UE through their closest gateway In order for the gateway nodes (i.e., each local network's edge router and each SR network nodes) to know the current UE location, each gateway node sends a location update message when the UE enters its domain. This allows the SR network control plane to keep track of the current domain and associated edge router for each UE. The mapping from each GIP to its most-recent domain gateway is kept in a data store, shown as locator DB 114 in FIG. 1, which can be implemented either as part of the SR network control plane or distributed on one or more separate servers.

SR gateways forward IP packets based on information in the locator DB. A brute force approach would be to constantly update all gateways whenever any UE location changes. Although this may be feasible when the network size is relatively small, in general, this is very inefficient since only a subset of SR gateways may see traffic destinated to a given UE and hence need such updates. In order to improve scalability, another approach is to do query-response reactively. In this approach, an SR gateway can query the locator DB when it needs to look up a UE location, and then cache such mapping information for a certain duration. The main issue with this approach is that, if the location changes before the cache has expired, then the packet will be routed to the wrong destination. Although this can be amended by additional protocol exchanges, this would add significant delay.

To address such issues, in certain embodiments of the disclosure, SR gateways explicitly subscribe to the location information of the "active" UEs (i.e., the UEs with active traffic) from the locator DB. The locator DB selectively pushes UE location updates to the SR gateways according to their current subscriptions. Different subscription policies can be configured at the SR gateways. For example, one policy can be: start subscription when the destination UE location is missing from the SR gateway's forwarding table (i.e., forwarding information base or FIB, for short), and stop subscription when no more packets destinated to the UE in the last, for example, two minutes. For critical apps with tight delay bounds, the policy can be to "always subscribe". In addition, it may be possible to use a machine-learning-based approach to predict the traffic patterns of a given UE and make/cancel subscriptions more intelligently.

Within each local network, all UE traffic traverses through the local network's edge router. This is similar to the existing local IP mobility solution. However, unlike in the existing solution, here the same GIP is assigned to the UE across all local networks. In some sense, the edge routers in different local networks work together as one large distributed global anchor.

When a UE enters a local network, the local network's edge router reports the location update to the SR network, which records the UE location and ensures all SR gateways know how to reach the current UE domain.

A publish-subscribe mechanism is used to ensure location update is delivered only to the SR gateways that need some information.

In the data plane, segment routing is used to forward traffic from the nearby SR gateway of the corresponding node to the current UE domain.

The solution involves the UE location being updated dynamically at SR network routers. Software-based routers can be used to either to replace or work together with conventional hardware-based routers, which can potentially increase the route update scalability by one to two orders of magnitude.

As represented in FIG. 1, a UE 130 changes from being directly associated with (AKA having an association with) a node in local network 120(A) to being directly associated with a node in local network 120(B). Note that the node in local network 120(A) may be, but does not have to be, edge router 122(A1), and the node in local network 120(B) may be, but does not have to be, edge router 122(B1). Note further that, in some situations, UE 130 is a mobile node that is capable of physically moving, which results in its association changing. As described further below, there may be implementations in which a UE's association changes without necessarily physically moving. In those situations, the UE does not necessarily have to be a mobile node. Although not explicitly shown in FIG. 1, those skilled in the art will understand that, at any given time, there will typically be multiple UEs and possibly other types of nodes that communicate via SR network 110.

According to certain embodiments of the disclosure, UE 130 is assigned a unique, permanent global IP (GIP) address that does not change as UE 130 changes from being associated with one access node to another. In the embodiment represented in FIG. 1, locator DB 114 of SR network 110 stores a mapping between the GIP of UE 130 and the physical IP address of the edge router 122 corresponding to the current association of UE 130, with that edge router 122 currently responsible for delivering packets to UE 130.

In the example represented in FIG. 1, when UE 130 is directly associated with a node in local network 120(A), locator DB 114 stores a mapping from the UE's GIP to the physical IP address ($IP_{A1}$) of edge router 122(A1). Note that this mapping in locator DB 114 is the same no matter with which node in local network 120(A) UE 130 is directly associated. When the association of UE 130 changes from a node in local network 120(A) to a node in local network 120(B), the corresponding mapping in locator DB 114 gets updated to be from the GIP of UE 130 to the physical IP address ($IP_{B1}$) of edge router 122(B1). Note that, here, too, this mapping in locator DB 114 is the same no matter with which node in local network 120(B) UE 130 is directly associated. Thus, if the UE's direct association changes between two different nodes 122 of the same local network 120, the mapping in locator DB 114 is not changed.

In some implementations, one or more and possibly all of the gateway nodes 112 in SR network 110 are each implemented using one or more software routers (not explicitly shown in FIG. 1), where locator DB 114 is controlled by an SR network control plane (not explicitly shown in FIG. 1) implemented by one or more and possibly all of those software routers. Note that, in other implementations, the SR network control plane function may be implemented at a particular node in SR network 110.

Note that, in some implementations, in addition to having one or more software routers, a gateway node 112 may have a hardware router (also not explicitly shown in FIG. 1). In this way, a legacy SR network having only hardware routers may be upgraded to implement SR network 110 of FIG. 1 by adding one or more software routers at each of one or more of the existing hardware routers. Depending on the particular implementation, a software router may be connected (i) in series with a hardware router with the hardware router located between the software router and other nodes or (ii) in parallel with the hardware router with both the software router and the hardware router being directly connected to other nodes. In other implementations, one or more software routers may be part of a hardware router, e.g., running in service blades in the hardware router.

To enable the SR network control plane to update locator DB 114 whenever UE 130 becomes associated with a new local network 120, the edge router 122 of that newly associated local network 120 transmits, to the directly associated SR gateway 112 in the SR network 110, an association update message (AKA mobility update message) identifying the edge router's physical IP address for the mapping in locator DB 114 for the UE's GIP. Thus, when UE 130 becomes associated with local network 120(B), edge router 122(B1) transmits, to SR gateway 112(2), an association update message identifying its physical IP address ($IP_{B1}$) for the UE's mapping in locator DB 114. In response, the SR network control plane updates the mapping in the locator DB 114 for UE 130 accordingly. In addition, in some implementations, when the association of UE 130 with local network 120(A) ends, edge router 122(A1) also transmits an association update message to SR gateway 112(1) notifying the SR network control plane that UE 130 is no longer associated with the edge router's IP address $AP_{A1}$.

In addition to the association update messages transmitted by edge routers 122 to the corresponding SR gateways 112, an edge router 122 will also advertise the GIP of a newly associated UE using, for example, the Border Gateway Protocol (BGP).

Each SR gateway 112 maintains a local forwarding information base (FIB) (not shown in FIG. 1) that contains copies of the same mappings in locator DB 114 for a subset of the UEs to which the SR gateway 112 subscribes, where, in some implementations, that subset corresponds to those UEs whose communications have been recently supported by the SR gateway 112. When a UE becomes associated with a local network 120, the SR gateway 112 associated with that local network 120 publishes the UE location. If an SR gateway 112 that is not associated with a UE's local network 120 needs to forward traffic to the UE, then that SR gateway 112 will subscribe to the UE via the SR network control plane.

The SR network control plane keeps track in locator DB 114 of which SR gateways 112 currently subscribe to each different UE represented in locator DB 114. When the control plane updates an existing mapping or creates a new mapping in locator DB 114 for a UE, the control plane transmits a corresponding association update message to each subscribing SR gateway 112, which will update its FIB accordingly. In this way, each SR gateway 112 maintains a current record of all of its subscribed UEs. Note that, in some implementations, the SR network control plane and individual SR gateways 112 implement procedures for purging the locator DB and the respective FIBs of "old" UEs that have not recently communicated via those resources.

Flow Path

Figure 2:
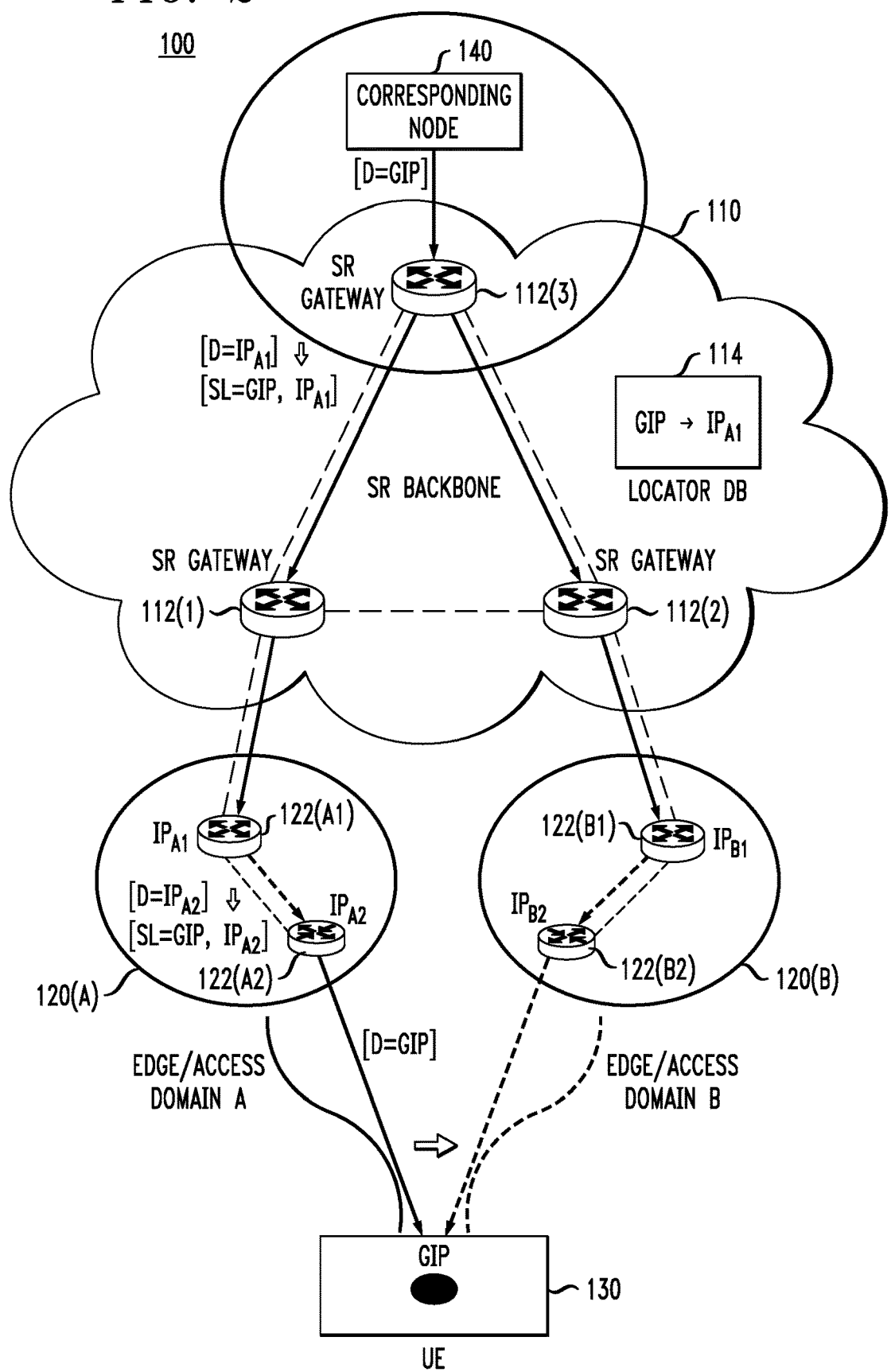
FIG. 2 is a block diagram of a particular scenario for the comm system of FIG. 1.

FIG. 2 is a block diagram of a particular scenario for comm system 100 of FIG. 1 in which a corresponding node 140 initiates a communication session with UE 130 when UE 130 is directly associated with local node 122(A2) of local network 120(A) and then, during that communication session, UE 130 changes (e.g., physically moves) from being directly associated with local node 122(A2) to being directly associated with local node 122(B2) of local network 120(B). Note that, depending on the situation, corresponding node 140 may itself be mobile or stationary. Note further that corresponding node 140 may be directly associated with SR gateway 112(3) (as shown in FIG. 2) or indirectly associated via one (or more) local network(s) (not shown in FIG. 2) that is(are) associated with both corresponding node 140 and SR gateway 112(3).

At the start of this scenario, locator DB 114 stores a mapping of the GIP for UE 130 to the physical IP address ($IP_{A1}$) of the edge router (i.e., 122(A1)) in the local network (i.e., 120(A)) then directly associated with UE 130. Furthermore, at this time, it is assumed that corresponding node 140 knows the GIP of UE 130, but does not know the UE's current location.

To initiate a communication session with UE 130, corresponding node 140 transmits a message (e.g., an IP data packet) that includes the UE's GIP in the message header as the destination address. If corresponding node 140 is a stationary node, then the message will also include the physical IP address of corresponding node 140 as a source address in the message header. If, however, corresponding node 140 also has a GIP, then the message will include the corresponding node's GIP as a source address. In this latter case, depending on the implementation, the message might or might not also include the current physical IP address of corresponding node 140 as part of the source address.

The message is forwarded by routers to reach SR gateway 112(3), which is the closest router that advertises the IP prefix corresponding to the UE's GIP. If SR gateway 112(3) does not already have a mapping for UE 130 in its FIB, then SR gateway 112(3) retrieves the UE's mapping from locator DB 114, stores that mapping in its FIB, and subscribes to UE 130 with the SR network control plane. SR gateway 112(3) then applies SR "Encapsulation" behavior to (i) set the IP address identified in the mapping (in this case, $IP_{A1}$) as the new destination address in the message header and (ii) insert a new SR header with GIP and $IP_{A1}$ in its Segment List (SL). The SR gateway 112(3) then forwards the message to the next hop (in this case, SR gateway 112(1)), which, in turn, forwards the message to the edge router having that physical IP address (in this case, edge router 122(A1)).

Note that, if corresponding node 140 also has a GIP and if SR gateway 112(3) does not have a mapping in its FIB for corresponding node 140, then SR gateway 112(3) will (i) add an appropriate mapping for corresponding node 140 in its FIB and (ii) publish the location of the mobile corresponding node 140 via the SR network control plane. Note that, if locator DB 114 does not already have a GIP mapping for corresponding node 140, then the SR network control plane will add that mapping to locator DB 114.

Edge router 122(A1) is aware of all of the UEs (and other external nodes) that are associated with its local network 120(A) including which local nodes 122 are directly associated with those UEs. In particular, in this case, edge router 122(A1) knows that UE 130 is directly associated with local node 122(A2). As such, when edge router 122(A1) receives the message from SR gateway 112(1), edge router 122(A1) processes the SR header as follows: (i) it applies the SR "Endpoint" behavior to remove the old SR header and restores GIP as the destination; (ii) it then determines that the UE having that GIP is directly associated with local node 122(A2); and (iii) in that case edge router 122(A1) applies SR "Encapsulation" behavior to insert a new SR header in the message header with the physical IP address $IP_{A2}$ of local node 122(A2) as the new destination and then forwards the message to local node 122(A2). Local node 122(A2) then removes the SR header and replaces its physical IP address $IP_{A2}$ as the destination address in the message header with the GIP of UE 130 and transmits that message to UE 130.

When the message arrives, UE 130 will use the source address in the received message as the destination address for any return message sent to corresponding node 140 via the UE's local node 122. If that destination address is a GIP for corresponding node 140 that is itself registered with SR network 110, then the return message will be routed to corresponding node 140 via SR network 110 in a manner analogous to the transmission of the original message but using the GIP of corresponding node 140 as the destination address of the return message. If the corresponding node's address is not a GIP, then the return message can be, but need not be routed to the corresponding node 140 via the SR network 110.

As long as UE 130 remains directly associated with local node 122(A2), the communication session can continue with (i) corresponding node 140 transmitting its messages to UE 130 via SR network 110 and (ii) UE 130 transmitting its return messages to corresponding node 140 either via SR network 110 or independent of SR network 110, depending, in part, on whether or not corresponding node 140 has its own GIP.

As used herein, a first node is said to be associated with or, equivalently, have an association with a second node if those two nodes are currently configured to communicate with one another either directly or indirectly. Thus, for the communication session described above, corresponding node 140, SR gateway 112(3), SR gateway 112(1), edge router 122(A1), local node 122(A2), and UE 130 are all associated (AKA have an association) with one another, with, for example, UE 130 being directly associated with local node 122(A2) and indirectly associated with each of those other nodes.

At some point in time during the scenario depicted in FIG. 2, before the communication session is terminated, UE 130 changes from being associated with local node 122(A2) to being associated with local node 122(B2) of the different local network 120(B). When that happens, edge router 122(B1) becomes aware of the new association between local node 122(B2) and UE 130, and, as described above, edge router 122(B1) transmits an association update message to SR gateway 112(2), which causes the SR network control panel to update the UE's mapping in locator DB 114 to replace the physical IP address $IP_{A1}$ for edge router 122(A1) with the physical IP address $IP_{B1}$ for edge router 122(B1). Note that SR gateway 112(2) will also update its FIB and, if needed, subscribe to UE 130. Furthermore, since SR gateway 112(3) is already subscribed to UE 130, the SR network control plane will forward the updated mapping for SR gateway 112(3) to use to update its FIB.

As such, when corresponding node 140 subsequently transmits messages to SR gateway 112(3) for UE 130, those messages will be forwarded to SR gateway 112(2), instead of SR gateway 112(1), then forwarded to edge router 122(B1), then forwarded to local node 122(B2), then forwarded to UE 130 using processing analogous to that described previously, and UE 130 will likewise transmit return messages to corresponding node 140 using processing analogous to that described previously.

In some implementations, when the association of UE 130 with local network 120(A) ends, edge router 122(A1) of local network 120(A) also transmits a corresponding association update message to the corresponding SR gateway 112(1). In that case, SR gateway 112(1) can access locator DB 114 to update its FIB for UE 130 and, if there are any messages from corresponding node 140 that are still in transit within SR network 110, SR gateway 112(1) can forward those messages to SR gateway 112(2) to be delivered to UE 130.

Note that, if UE 130 subsequently changes from being associated with local node 122(B2) to being associated with another node in local network 120(B) (including possibly edge router 122(B1)), edge router 122(B1) will become aware of that new association, but the mapping in locator DB 114 does not need to be updated because that mapping remains to the same edge router 122(B1). Only when the UE's association changes to a different local network 120 (having a different edge router 122) will the mapping in locator DB 114 need to be updated.

Scalable Forwarding Table Update

By using the publish-subscribe model, location updates are only made at SR network routers where they are actually needed. However, depending on the number of active UEs and their mobility patterns, there can still be a high rate of location changes, causing high rate of route updates. For conventional hardware-based routers, there are typically route-update rate limits ranging from thousands to tens of thousands of updates per second, due to the data transfer bottleneck between control and data planes.

Fortunately, the vast improvement of software-based routers in recent years can alleviate this problem. Performance evaluation has shown software routers can support packet-forwarding rates of 100 Gbps and beyond. Since both route update and packet forwarding are done using the same table using software, it is easier to trade off between packet-forwarding rate and route-update rate in software routers.

Depending on the required bandwidth in the network, either software routers can be used to directly replace conventional hardware routers to serve as SR gateways, or they can work along with the hardware routers. In the latter case, the hardware router can still be used to handle regular traffic, while the packets destinated to the GIP prefixes can be diverted to a cluster of software routers, letting each software router handle a sub-range of the GIP prefix. Due to IP mobility, route aggregation would not be applicable. One way is to use a hash table to implement the forwarding table in the software routers to allow efficient IP lookup and update. This forwarding table provides the mapping from the destination GIP to the SR header insertion rule based on the UE's current location.

In this way, a location update results in an update in the IP forwarding table, which can be done efficiently in software routers. The overall router capacity for handling mobile IP traffic can be scaled up by putting in more software routers.

Multiple Interfaces

When a UE has multiple access interfaces such as LTE/5G/WiFi, the same SR network can be used to help select the most-suitable access network based on any given criteria or policy. To enable this, an additional virtual segment router (vSR) module is added to the UE to support segment routing in the host. As one example, this module can be implemented in host kernel using extended Berkeley Packet Filter (eBPF)/eXpress Data Path (XDP).

Figure 3:
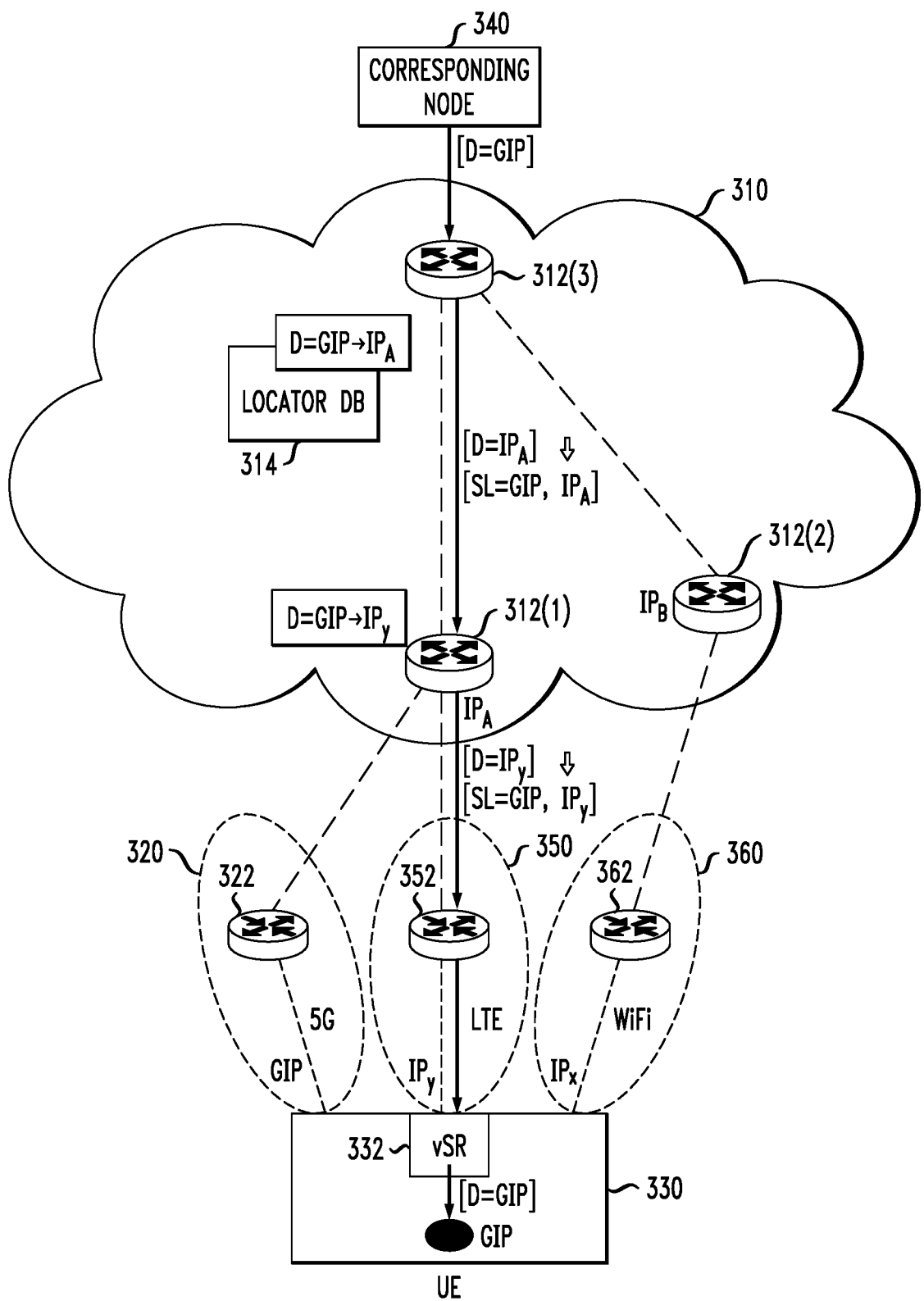
FIG. 3 is a simplified block diagram of a comm system according to another embodiment of the disclosure.

FIG. 3 is a simplified block diagram of a comm system 300 according to another embodiment of the disclosure. Comm system 300 is analogous to comm system 100 of FIGS. 1 and 2 with analogous elements having analogous labels 310-340. Comm system 300 includes SR network 310 having three SR gateways 312(1)-312(3), where the physical IP address of SR gateway 312(1) is $IP_A$, and the physical IP address of SR gateway 312(2) is $IP_B$.

As represented in FIG. 3, UE 330 (which might be mobile or stationary) can communicate with SR network 310 via any one of the following three different local access networks:

5G local network 320 via 5G local node 322 and SR gateway 312(1) using the UE's 5G IP address GIP;
LTE local network 350 via LTE local node 352 and SR gateway 312(1) using the UE's LTE IP address IPy; and
WiFi local network 360 via WiFi local node 362 and SR gateway 312(2) using the UE's WiFi IP address IPx.

In this embodiment, for each associated UE, the associated SR gateway 312 keeps track of the UE's current IP address. Thus, when UE 330 is associated with 5G local node 322 of 5G local network 320, SR gateway 312(1) stores the UE's 5G IP address GIP. When UE 330 is associated with LTE local node 352 of LTE local network 350, SR gateway 312(1) stores the UE's LTE IP address IPy. And when UE 330 is associated with WiFi local node 362 of WiFi local network 360, SR gateway 312(2) stores the UE's WiFi IP address IPx.

As such, in this embodiment, when UE 330 is associated with SR gateway 312(1), locator DB 314 stores a mapping from the UE's GIP to that SR gateway's physical IP address $IP_A$, independent of whether the UE is associated with the 5G local network 320 or the LTE local network 350. Similarly, when UE 330 is associated with SR gateway 312(2), locator DB 314 stores a mapping from the UE's GIP to that SR gateway's physical IP address $IP_B$.

Assume, for example, a scenario in which UE 330 is initially associated with LTE local node 352 of LTE local network 350 such that (i) SR gateway 312(1) stores a mapping from the UE's 5G IP address GIP to the UE's current LTE IP address IPy in its FIB and (ii) locator DB 114 stores a mapping from the UE's 5G IP address GIP to that SR gateway's IP address $IP_A$. In that case, to initiate a comm session with UE 330, corresponding node 340 transmits, to SR gateway 312(3), a message having the UE's 5G IP address GIP. SR gateway 312(3) accesses its FIB or, if necessary, locator DB 314 to determine that GIP is mapped to the address $IP_A$ of SR gateway 312(1). SR gateway 312(3) adds the destination address $IP_A$ to the message and forwards the message to SR gateway 312(1), which determines that the UE's current IP address is IPy, replaces the destination address $IP_A$ in the message with the destination address IPy, and forwards the message to LTE local node 352 for transmission to UE 330. The message that is forwarded to the UE 330 has an SR header that contains a Segment List (SL) that includes the UE's GIP which the UE's vSR module 332 uses to modify the destination address from IPy to GIP and that is how the message maintains the GIP destination address no matter which access network is used to convey the message to the UE 330.

If, during this time, the UE's LTE access connectivity is lost (or LTE is no longer the best access to use for this connection), the connection from the corresponding node can be immediately switched to use a different access network (e.g., 5G) without any significant disruption. For this, either LTE local node 352 may report the loss of LTE access connectivity to SR gateway 312(1) or the loss of access connectivity may be detected by the UE's vSR module 332, which may then report the loss to SR gateway 312(1). In either case, SR gateway 312(1), upon receiving this update, forwards any subsequent packets from corresponding node 340 for UE 330 through 5G local node 322. Note that the packets delivered to UE 330 maintain the same destination IP address (i.e., GIP) even if sent over non-5G access. Hence, the application connection is not disrupted by this access switch and is seamlessly handed off. Note also that the solution has the flexibility to only switch access network for connections from a selected set of corresponding nodes 340 or even on a per-application basis. Such dynamic load balancing of connections can help mitigate last-mile network congestion and improve latency performance.

With this solution, there is also flexibility in dynamic selection of last-mile access technologies in the uplink direction. For this uplink access, selection policies for UE 330 may be implemented in the vSR module 332. In particular, vSR module 332 includes the SR segment for the SR gateway 312 of the preferred access in the packets received from the application, before sending them out of the network interface of the UE for the corresponding access. Just as in downlink, with this solution, the uplink access used for an application can also be dynamically switched without disrupting any ongoing network connections. The solution therefore can support seamless handoffs between different access technologies as well as flexible load balancing across different access technologies.

Referring again to FIG. 3, if and when the UE 330 changes its association from LTE local node 352 to 5G local node 322 of 5G local network 320, SR gateway 312(3) receives an association update message for that association change and updates its FIB to reflect that the UE's global IP address GIP is also its current IP address. In that case, when SR gateway 312(1) receives a subsequent message from corresponding node 340 for UE 330, SR gateway 312(1) replaces its destination address $IP_A$ in the message with the UE's current IP address GIP and forwards the message to 5G local node 322 for transmission to UE 330. Note that, in this scenario, the FIB at SR gateway 312(3) and locator DB 314 do not need to be updated.

If and when, however, UE 330 changes its association from either LTE local node 352 or 5G local node 322 to WiFi local node 362 of WiFi local network 360, SR gateway 312(2) receives an association update message for that association change and updates its FIB to add a mapping from the UE's global IP address GIP to the UE's current WiFi IP address IPx. In addition, SR gateway 312(2) causes the SR network control plane to update both locator DB 314 and the FIB at SR gateway 312(3) to map the UE's GIP to the IP address $IP_B$ for SR gateway 312(2). In that case, when SR gateway 312(3) receives subsequent messages from corresponding node 340 for UE 330, SR gateway 312(3) (i) adds the destination address $IP_B$ to those messages along with the UE's IP address GIP contained in their SR header and (ii) forwards the messages to SR gateway 312(2), which replaces its destination address $IP_B$ with the UE's current WiFi IP address IPx for transmission to UE 330 via WiFi local node 362.

Figure 4:
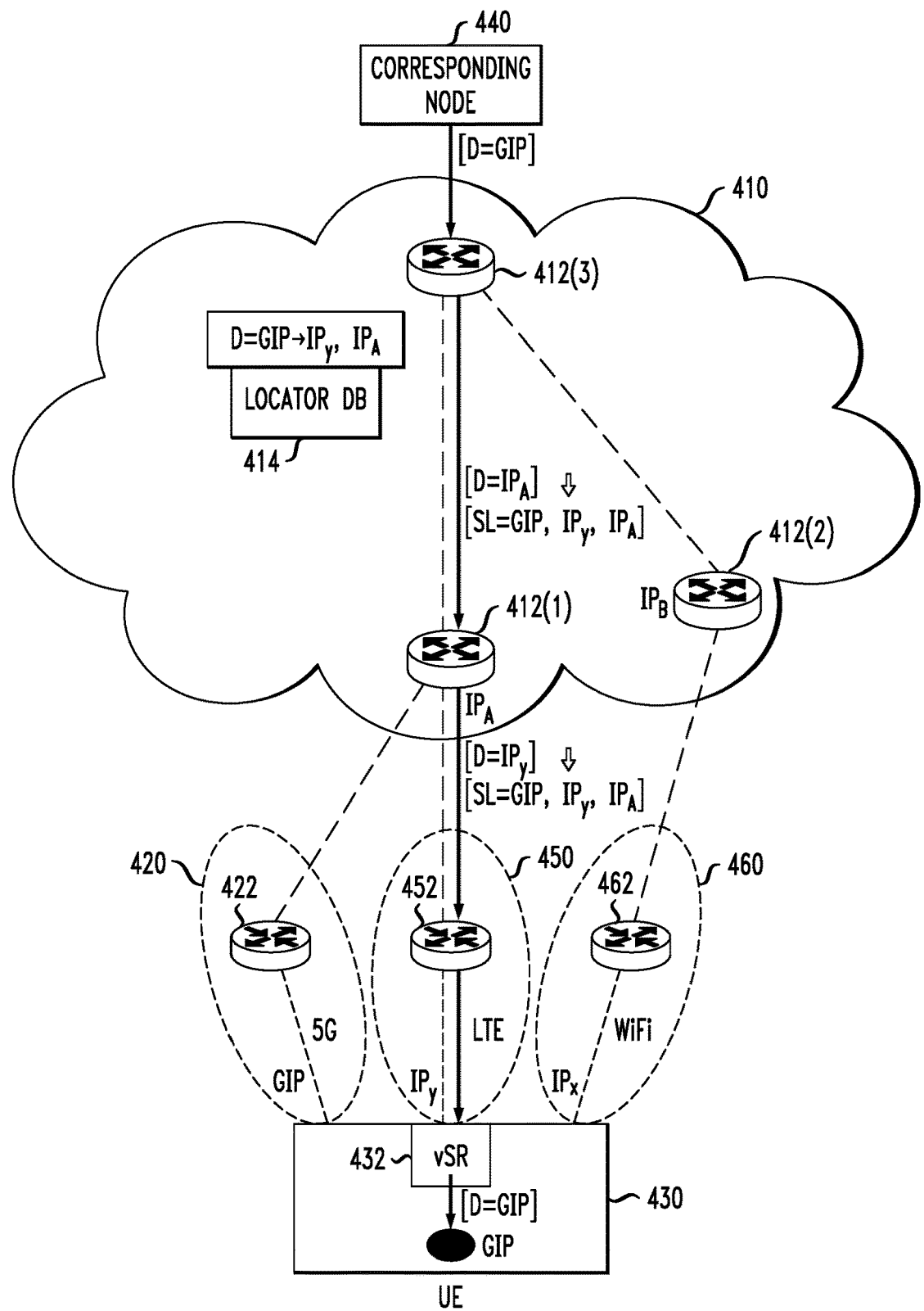
FIG. 4 is a simplified block diagram of a comm system according to yet another embodiment of the disclosure.

FIG. 4 is a simplified block diagram of a comm system 400 according to yet another embodiment of the disclosure. Comm system 400 is analogous to comm system 300 of FIG. 3 with analogous elements having analogous labels 410-462.

The main difference between comm system 400 and comm system 300 is that, in comm system 400, the mappings in locator DB 414 include the UEs' current IP addresses in addition to the IP addresses of the associated SR gateways 412. Thus, when UE 430 is associated with 5G local network 420, the mapping in locator DB 414 for UE 430 includes both the IP address $IP_A$ for SR gateway 412(1) and the UE's current (5G) IP address GIP as well as the UE's global IP address GIP. Similarly, when UE 430 is associated with LTE local network 450, the mapping in locator DB 414 for UE 430 includes both the IP address $IP_A$ for SR gateway 412(1) and the UE's current (LTE) IP address IPy as well as the UE's global IP address GIP. And when UE 430 is associated with WiFi local network 460, the mapping in locator DB 414 for UE 430 includes both the IP address $IP_B$ for SR gateway 412(2) and the UE's current (WiFi) IP address IPx as well as the UE's global IP address GIP.

In this embodiment, the mapping in locator DB 414 for UE 430 gets updated whenever UE 430 changes its association, including when UE 430 changes its association within the same local access network. Here, too, UE 430 has a vSR module 432 to enable this functionality.

In the comm systems of FIGS. 1-4, UEs are shown as being directly associated with nodes in local access networks that are themselves directly associated via their edge routers with SR gateways in SR networks. Similarly, corresponding nodes are shown as being directly associated with SR gateways in the SR networks. The disclosure is not necessarily limited to such associations. In general, each UE and each corresponding node may be associated with an SR gateway of an SR network via zero, one, or more (serially connected) access networks.

Furthermore, although messages between UEs and corresponding nodes are routed through the SR networks using segment routing, segment routing may be used, but does not necessarily have to be used, for the routing of those messages to and from the SR networks. For example, with respect to a message routed from corresponding node 140 to UE 130 via local network 120(A) in FIG. 2, the routing from corresponding node 140 to SR gateway 112(3) might or might not involve segment routing, depending on the implementation; the routing from SR gateway 112(3) to SR gateway 112(1) through SR network 110 relies on segment routing; and the routing from SR gateway 112(1) to UE 130 through local network 120(A) might or might not involve segment routing, again depending on the implementation.

Furthermore, although the disclosure has been described in the context of embodiments in which the locator DBs store specific types of mappings, the disclosure is not limited to those specific types. For example, locator DB 114 of FIGS. 1 and 2 stores mappings from UEs' GIPs to the IP addresses of associated edge routers 122, locator DB 314 of FIG. 3 stores mappings from UEs' GIPs to the IP addresses of associated SR gateways 312, and locator DB 414 of FIG. 4 stores mappings from UEs' GIPs to both the IP addresses of associated SR gateways 312 and the UEs' current IP addresses. The common feature between these different embodiments is that the final (i.e., furthest downstream) nodes identified in the mappings have knowledge of how to complete the routing of received messages to the UEs. In particular, in FIGS. 1 and 2, the associated edge routers 122 know how to complete the routing of received messages from corresponding nodes to the UEs. Similarly, in FIG. 3, the SR gateways 312 know how to complete the routing of received messages from corresponding nodes to the UEs. In FIG. 4, the final nodes in the mappings are the UEs themselves. As such, in general, locator DBs of the disclosure satisfy the generic rule that the final nodes identified in the mappings are assumed to know how to complete the routing of messages to their intended destinations. Thus, the IP addresses of the final nodes in the mappings are not necessarily limited to the current IP addresses of the SR gateways, edge routers, and UEs as happens to be the case in the examples of FIGS. 1-4.

In certain embodiments of the present disclosure, a segment routing (SR) network is configured to be connected to a plurality of local networks, the SR network comprising a plurality of interconnected SR gateways, wherein each local network is connectable to an SR gateway at an edge router of the local network. An SR network control plane of the SR network is configured to maintain a locator database configured to map (i) a global IP (GIP) address for a user equipment (UE) to (ii) an IP address of a downstream node associated with the UE along a path from the SR network to the UE. An SR gateway is configured to (i) receive a message for the UE and (ii) address the message to the IP address of the downstream node. The SR network control plane is configured to update the locator database to map (i) the GIP address for the UE to (ii) a different IP address of a downstream node upon the SR network control plane determining that the association of the UE has changed to the different downstream node IP address.

In at least some of the above embodiments, the two downstream node IP addresses are IP addresses for two edge routers in two different local networks associated with the same SR gateway.

In at least some of the above embodiments, the two downstream node IP addresses are IP addresses for two different SR gateways.

In at least some of the above embodiments, the two downstream node IP addresses are IP addresses for the UE for two different access networks.

In at least some of the above embodiments, each SR gateway is configured to maintain a forwarding information base (FIB) mapping GIPs of UEs to downstream node IP addresses.

In at least some of the above embodiments, an SR gateway is configured to (i) receive a message having a GIP for a UE that is not in its FIB, (ii) access the locator database to retrieve the IP address of the downstream node associated with the UE, and (iii) store a mapping of the GIP to the downstream node IP address in the SR gateway's FIB.

In at least some of the above embodiments, at least one SR gateway comprises one or more software routers.

In at least some of the above embodiments, at least one SR gateway comprises a hardware router and one or more software routers, wherein the one or more software routers are configured to handle one or more UEs having GIPs and the hardware router is configured to handle one or more other UEs.

In at least some of the above embodiments, the SR network control plane is configured to (a) receive an association update message from a downstream node informing the SR network control plane that the association of the UE has changed to the IP address of the downstream node and (b) update the locator database based on the association update message to map (i) the GIP address for the UE to (ii) the IP address of the downstream node.

In at least some of the above embodiments, an SR gateway is configured to selectively subscribe to receive association update messages for the IP addresses of downstream nodes associated with the UE.

In certain other embodiments of the present disclosure, user equipment (UE) comprises (i) a plurality of network interfaces corresponding to different types of local access networks and (ii) a virtual segment router (vSR) module connected to the plurality of network interfaces and configured to support segment routing via any of the different types of local access networks.

In at least some of the above embodiments, the vSR module is implemented in host kernel using extended Berkeley Packet Filter (eBPF)/eXpress Data Path (XDP).

Although not explicitly shown in the figures, each node in the figures has at least one processor (e.g., a CPU) for processing incoming and/or outgoing data, memory (e.g., RAM, ROM) for storing data and (in some implementations) program code to be executed by the processor, and communication hardware (e.g., transceivers) for communicating with one or more other nodes.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A segment routing (SR) network configured to be connected to a plurality of local networks, the SR network comprising a plurality of interconnected SR gateways, wherein each local network is connectable to an SR gateway at an edge router of the local network, wherein:
    an SR network control plane of the SR network is configured to maintain, in the SR network, a locator database configured to map (i) a global IP (GIP) address for a user equipment (UE) to (ii) an IP address of a downstream node associated with the UE along a path from the SR network to the UE;
    an SR gateway is configured to (i) receive a message for the UE and (ii) address the message to the IP address of the downstream node; and
    the SR network control plane is configured to update the locator database to map (i) the GIP address for the UE to (ii) a different IP address of a downstream node upon the SR network control plane determining that the association of the UE has changed to the different downstream node IP address.

2. The SR network of claim 1, wherein the two downstream node IP addresses are IP addresses for two edge routers in two different local networks associated with the same SR gateway.

3. The SR network of claim 1, wherein the two downstream node IP addresses are IP addresses for two different SR gateways.

4. The SR network of claim 1, wherein the two downstream node IP addresses are IP addresses for the UE for two different access networks.

5. The SR network of claim 1, wherein each SR gateway is configured to maintain a forwarding information base (FIB) mapping GIPs of UEs to downstream node IP addresses.

6. The SR network of claim 5, wherein an SR gateway is configured to (i) receive a message having a GIP for a UE that is not in its FIB, (ii) access the locator database to retrieve the IP address of the downstream node associated with the UE, and (iii) store a mapping of the GIP to the downstream node IP address in the SR gateway's FIB.

7. The SR network of claim 1, wherein at least one SR gateway comprises one or more software routers.

8. The SR network of claim 1, wherein at least one SR gateway comprises a hardware router and one or more software routers, wherein the one or more software routers are configured to handle one or more UEs having GIPs and the hardware router is configured to handle one or more other UEs.

9. The SR network of claim 1, wherein the SR network control plane is configured to (a) receive an association update message from a downstream node informing the SR network control plane that the association of the UE has changed to the IP address of the downstream node and (b) update the locator database based on the association update message to map (i) the GIP address for the UE to (ii) the IP address of the downstream node.

10. The SR network of claim 9, wherein an SR gateway is configured to selectively subscribe to receive association update messages for the IP addresses of downstream nodes associated with the UE.

11. A method for a segment routing (SR) network configured to be connected to a plurality of local networks, the SR network comprising a plurality of interconnected SR gateways, wherein each local network is connectable to an SR gateway at an edge router of the local network, wherein:
- an SR network control plane of the SR network maintains, in the SR network, a locator database configured to map (i) a global IP (GIP) address for a user equipment (UE) to (ii) an IP address of a downstream node associated with the UE along a path from the SR network to the UE;
- an SR gateway (i) receives a message for the UE and (ii) addresses the message to the IP address of the downstream node; and
- the SR network control plane updates the locator database to map (i) the GIP address for the UE to (ii) a different IP address of a downstream node upon the SR network control plane determining that the association of the UE has changed to the different downstream node IP address.

12. The method of claim 11, wherein the two downstream node IP addresses are IP addresses for two edge routers in two different local networks associated with the same SR gateway.

13. The method of claim 11, wherein the two downstream node IP addresses are IP addresses for two different SR gateways.

14. The method of claim 11, wherein the two downstream node IP addresses are IP addresses for the UE for two different access networks.

15. The method of claim 11, wherein each SR gateway is configured to maintain a forwarding information base (FIB) mapping GIPs of UEs to downstream node IP addresses.

16. The method of claim 15, wherein an SR gateway is configured to (i) receive a message having a GIP for a UE that is not in its FIB, (ii) access the locator database to retrieve the IP address of the downstream node associated with the UE, and (iii) store a mapping of the GIP to the downstream node IP address in the SR gateway's FIB.

17. The method of claim 11, wherein at least one SR gateway comprises one or more software routers.

18. The method of claim 11, wherein the SR network control plane is configured to (a) receive an association update message from a downstream node informing the SR network control plane that the association of the UE has changed to the IP address of the downstream node and (b) update the locator database based on the association update message to map (i) the GIP address for the UE to (ii) the IP address of the downstream node.

19. The SR network of claim 1, further comprising the UE, the UE comprising:
- a plurality of network interfaces corresponding to different types of local access networks; and
- a virtual segment router (vSR) module connected to the plurality of network interfaces and configured to support segment routing via any of the different types of local access networks.

20. The SR network of claim 19, wherein the vSR module is implemented in host kernel using extended Berkeley Packet Filter (eBPF)/eXpress Data Path (XDP).

* * * * *